(12) United States Patent
Aponte Luis

(10) Patent No.: US 10,752,214 B2
(45) Date of Patent: Aug. 25, 2020

(54) SECURITY SYSTEM AND METHOD FOR VEHICLES

(71) Applicant: ONTECH SECURITY, SL, La Rinconada Sevilla (ES)

(72) Inventor: Juan Aponte Luis, La Rinconada Sevilla (ES)

(73) Assignee: ONTECH SECURITY, SL, La Rinconada Servilla (ES)

( * ) Notice: Subject to any disclaimer, the term of this patent is extended or adjusted under 35 U.S.C. 154(b) by 124 days.

(21) Appl. No.: 15/774,247

(22) PCT Filed: Nov. 4, 2016

(86) PCT No.: PCT/ES2016/070785
§ 371 (c)(1),
(2) Date: May 7, 2018

(87) PCT Pub. No.: WO2017/077166
PCT Pub. Date: May 11, 2017

(65) Prior Publication Data
US 2019/0047516 A1 Feb. 14, 2019

(30) Foreign Application Priority Data
Nov. 5, 2015 (ES) .................................. 201531588

(51) Int. Cl.
*B60R 25/102* (2013.01)
*B60R 25/30* (2013.01)
(Continued)

(52) U.S. Cl.
CPC .......... *B60R 25/305* (2013.01); *B60R 25/102* (2013.01); *B60R 25/31* (2013.01);
(Continued)

(58) Field of Classification Search
None
See application file for complete search history.

(56) References Cited

U.S. PATENT DOCUMENTS

2009/0284358 A1* 11/2009 Ieda .................... E05B 17/10
340/425.5
2010/0219951 A1 9/2010 Sosa
(Continued)

FOREIGN PATENT DOCUMENTS

JP H 1120640 A 8/1999
WO WO2015/044487 4/2015

OTHER PUBLICATIONS

International Search Report, dated Jan. 20, 2017 for corresponding International Application No. PCT/ES2016/070785 with English translation.

(Continued)

*Primary Examiner* — Eileen M Adams
(74) *Attorney, Agent, or Firm* — Intellectual Property Law Group LLP

(57) ABSTRACT

A vehicle (1) security system and method that comprises at least one controlled magnetic field sensor (10) connected to at least one antenna (11); where this antenna (11) is configured like a single electrode, in such a way that the controlled field sensor (10) measures the disturbances of the electrostatic field around the antenna (11); and where the controlled electrostatic fields (10) is configured to detect a disturbance in the electrostatic field (3), created by its own antenna (11); and where at least one antenna (11) is in a position between an area external to the vehicle (1); an area internal to the vehicle (1); and a parking area and where each sensor (10) is connected to a control device (100).

14 Claims, 4 Drawing Sheets

(51) Int. Cl.
*B60R 25/31* (2013.01)
*G08B 13/24* (2006.01)
*G08B 13/196* (2006.01)
*G08G 1/14* (2006.01)

(52) U.S. Cl.
CPC ... *G08B 13/19663* (2013.01); *G08B 13/2491* (2013.01); *G08G 1/14* (2013.01)

(56) References Cited

U.S. PATENT DOCUMENTS

| | | | | |
|---|---|---|---|---|
| 2013/0099943 | A1* | 4/2013 | Subramanya | B60Q 9/002 340/933 |
| 2014/0195125 | A1* | 7/2014 | Siegel | B60H 1/00742 701/49 |
| 2014/0210646 | A1* | 7/2014 | Subramanya | B61L 29/28 340/928 |

OTHER PUBLICATIONS

Written Opinion of the ISA, dated Jan. 20, 2017 for corresponding International Application No. PCT/ES2016/070785 with English translation.

Mel Maki. "Conductive Sensor Cables for Perimeter Intrusion Detection". Security Technology, 2007 41$^{st}$ Annual IEEE International Carnahan Conference on, Oct. 1, 2007 IEEE, Pi Jan. 10, 2007 pp. 163-168 XP031155260 ISBN 978-1-4244-1129-0; ISBN 1-4244-1129-7.

* cited by examiner

SECURITY SYSTEM AND METHOD FOR VEHICLES

CROSS-REFERENCE TO RELATED APPLICATIONS

This application is a U.S. National Phase application, under 35 U.S.C. § 371, of International Application no. PCT/ES2016/070785, with an international filing date of Nov. 4, 2016, and claims benefit of Spanish Application no. P201531588 filed on Nov. 5, 2015, each of which are hereby incorporated by reference for all purposes.

BACKGROUND OF THE INVENTION

1. Field of the Invention

This invention refers to a security system for all types of vehicles, including vehicles for transporting goods and people, both over ground, and by sea or air, and its objectives include detecting potentially dangerous elements and situations, detecting people inside the vehicles themselves or detecting vehicles in parking lots.

2. Background

Generally speaking, transport vehicles are equipped with well-known alarm systems, such as, the following:
 a) Volumetric sensors that detect changes in the measurement area volume and that are translated into movement detection.
 b) Pressure and/or movement sensors.
 c) Ultrasound detection sensors.

Comparing these detectors, the WO2015/044487 document describes an electrostatic field sensor and a security system for inside spaces that is able to measure electrostatic fields and their variations through a metal conductor that acts as an antenna or capture probe. This probe is connected to an electronic circuit able to decode these changes in the electrostatic field around the antenna's metallic conductor.

This system allows for measuring disturbances through a single antenna, and from there, deduce the presence of a person, distinguishing them from an animal or thing by measuring the disturbance itself on the single antenna. This system is conceived as a preventive alarm detector, by proximity. It doesn't describe a security detector system for vehicles like those outlined in this invention, which would be valid for internal and external security and under any condition, for which it would be necessary to modify the system outlined in the WO2015/044487 document.

On the other hand, the vehicle alarm systems that use magnetic field detectors are well-known. Therefore, the US2010219951 document describes a technology to define at least one variation in a magnetic field with at least one magnetic sensor, amplifying the variation by at least one electronic amplifier, the process of this variation using a processor and the activation of an alarm in the vehicle's electronic system. However, these alarm systems require complex installation in the vehicle as opposed to the system outlined in this invention.

In general, compared to the state of the act, the use of a electrostatic sensor which would detect the disturbances of an electrostatic field using a single antenna, configured as an electrode in such a way that it considerably simplifies detection, creating greater security and dependability for internal and external security for transport vehicles.

SUMMARY OF THE INVENTION

The object of this invention is a security system for vehicles that is more specific and easier to implement than those outlined in the state of the art, for which it is implemented by measuring the disturbances made in an electrostatic field due to human presence close by or inside, in any part of the car wanting to be protected.

The invention system includes at least one electrostatic sensor able to measure the disturbances generated by people, objects or animals around an antenna, which is, in turn, a transmitter of an electrostatic field and which detects the disturbances that are made in the transmitted field. This antenna, generally an electrode, transmits the electrostatic field in a routed sense, in other words, it can transmit toward a space around it and not omnidirectionally, shielding the part that is not wanted. That's why the provision of this antenna is different for each use, given that each antenna is free to detect a disturbance in the electrostatic field generated around it, despite being connected to a single circuit. Thanks to the provision of the antenna(s), it will be possible to define a closed physical space by the transmitted field, depending on the physical structure where it is implemented (modifying the provision of the different elements for each specific case) simply and without any limitations.

These advantages are reached with the different aspects outlined in the independent claims and are included here as a reference. Other particular implementations of the invention are outlined in the dependent claims, which are similarly incorporated here as a reference.

Thanks to the system outlined in those attached claims, a vehicle security system is obtained. This system, at first issue, is configured as a detector of objects attached to a vehicle, through detecting a person approaching and/or profiling foreign objects. At second issue, it is configured as a security element inside vehicles, such as, for detecting the suitable position for safety clips or detecting people in restrooms, holds or restricted areas. Lastly, the security system is able to precisely detect the vehicle's position in a parking lot or area.

Throughout the description and the claims the word "comprises" and its variants do not intend to exclude other technical characteristics, additives, components or steps. For experts in the field, other objects, advantages and characteristics of the invention will derive in part from the description and in part from the practice of the invention. The following examples and drawings are provided by way of illustration, and are not intended to restrict the present invention. In addition, the present invention covers all possible combinations of particular and preferred implementations indicated here.

BRIEF DESCRIPTION OF THE FIGURES

A brief description is given below of a series of figures that help to better understand the invention and that are expressly related to an implementation of said invention that is presented as a non-limiting example.

DESCRIPTION OF A PREFERRED EMBODIMENT OF THE INVENTION

Figure 1:
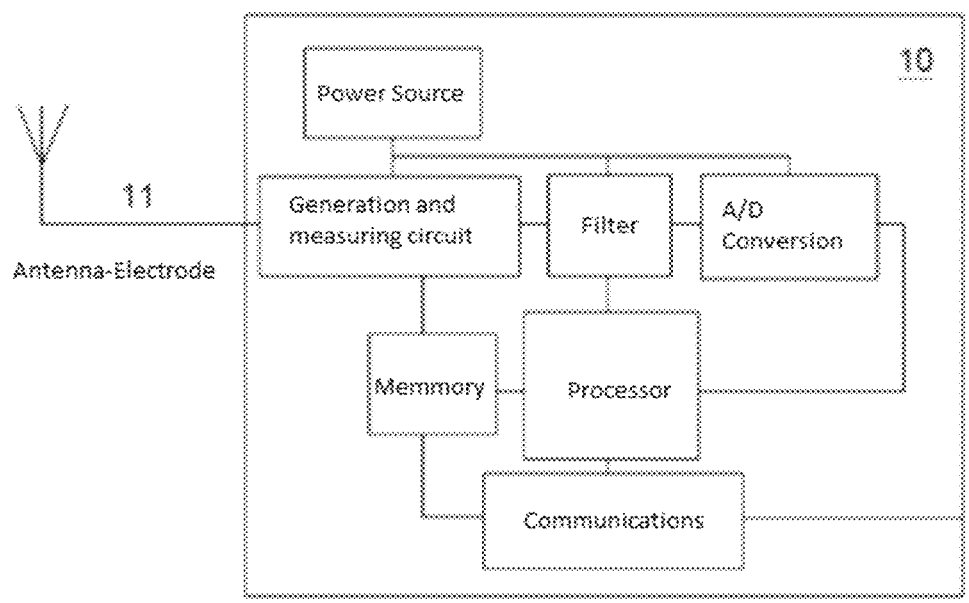
FIG. 1 Diagram of sensor blocks (10) in accordance with the invention.
Figure 2A:
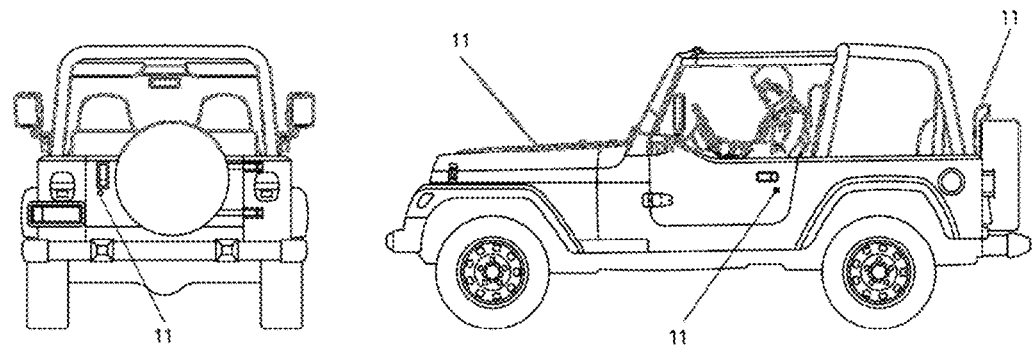
FIG. 2 System outline of the invention for external security.
Figure 2A:
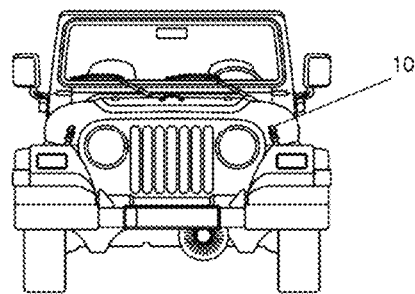
Figure 2B:
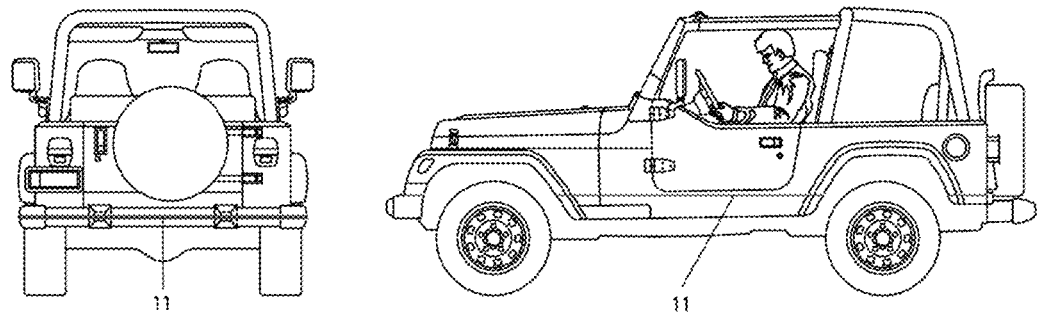
Figure 2B:
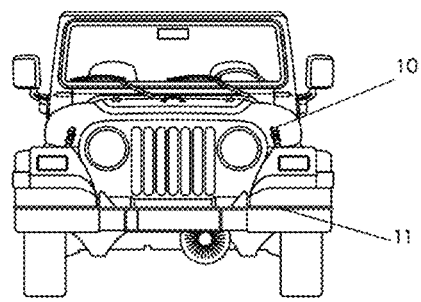
Figure 3:
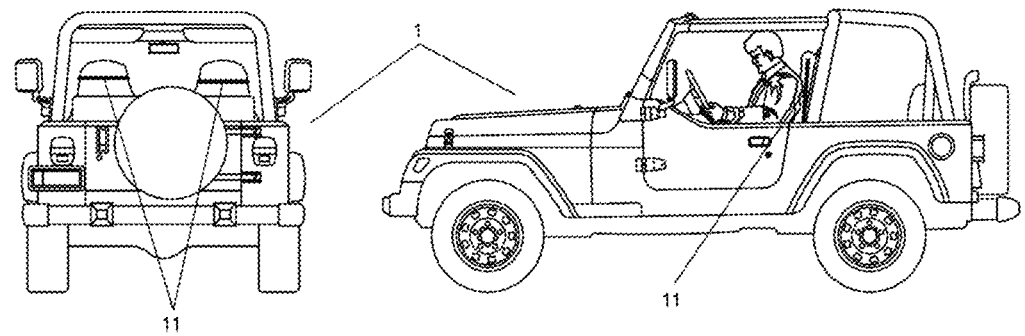
FIG. 3 System outline of the invention for internal security.
Figure 3:
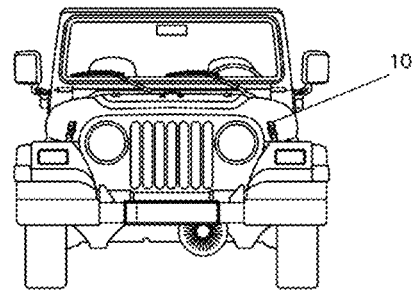
Figure 4:
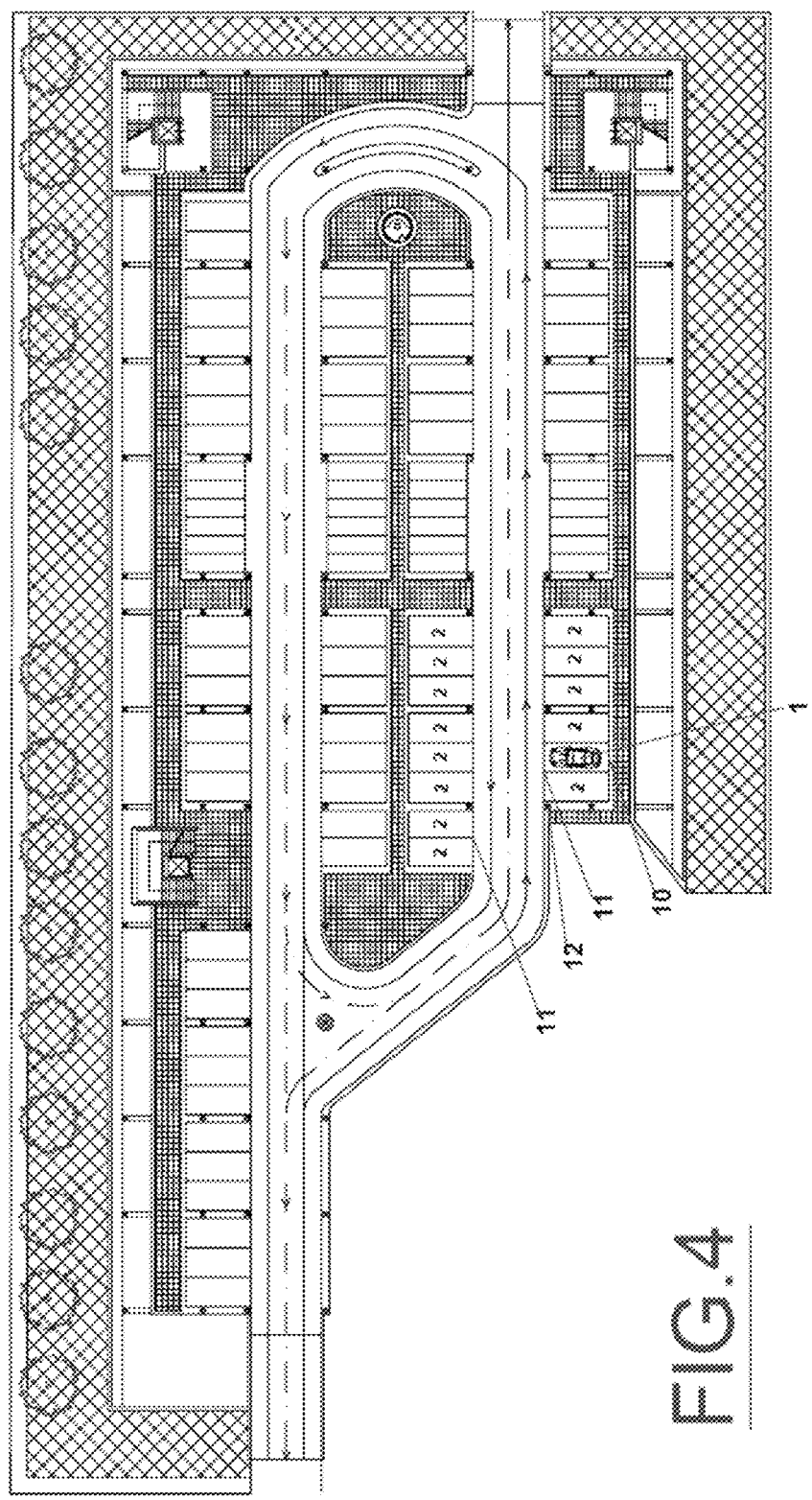
FIG. 4 System outline of the invention for parking detection.
Figure 5:
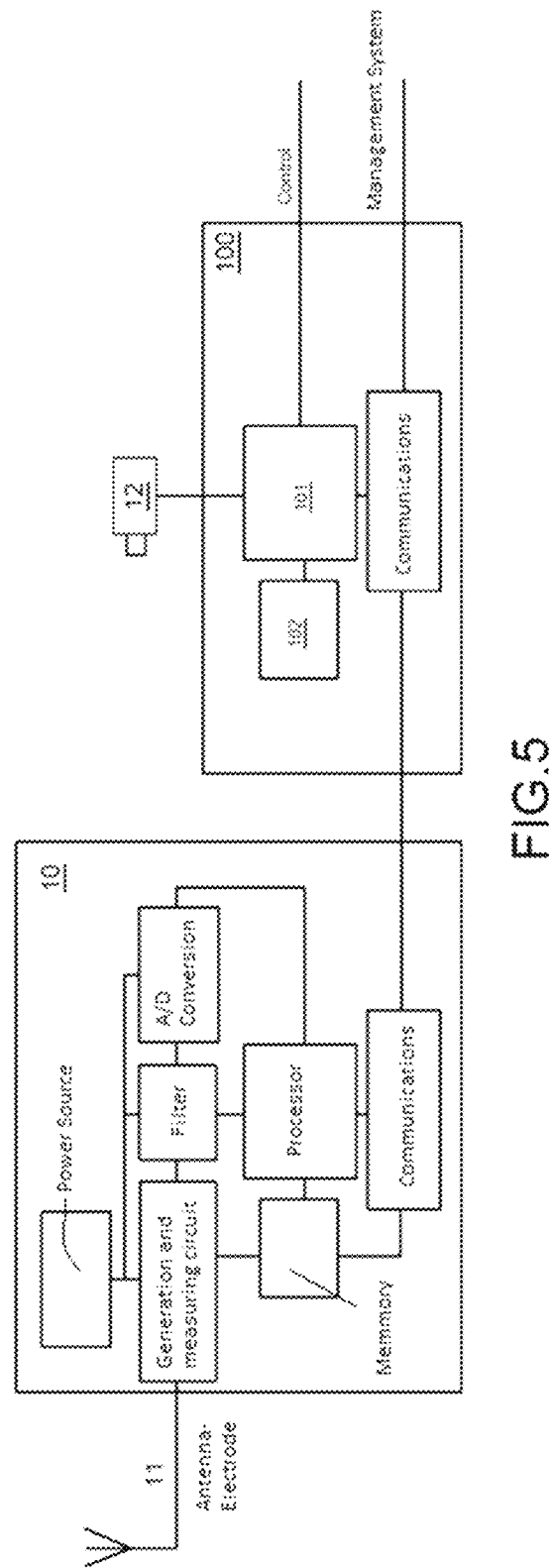
FIG. 5 It shows the block diagram of a control device (100) in accordance with this invention.

An aim of the invention is a security system for vehicles that comprise different practical implementations, as shown below, each of the specific implementations of the parts that make up the system concerning the invention are listed.

Electrostatic Field Sensor (10)

The electrostatic field sensor (10) is a solution based on the sensor outlined in Wo2015/044487, but improved for its use in other practical applications. However, in illustration 1, an alternative to this sensor is outlined. As can be appreciated in illustration 1, the electrostatic field sensor (10) comprises an antenna (11) that consists of one single electrode, which is, at the same time, transmitter and receiver (transmitter-receiver electrode) and is the antenna (11) used in each every one of the implementations that are put forth in this invention, albeit with different physical configurations and connectivities that can improve their functionality. It must be taken into account that several antennas can coexist in parallel in some implementations, albeit, each of them maintains the particularity of being a transmitter and receiver at the same time.

However, the controlled electrostatic field sensor (10) also involves a generation circuit and field measurement, preferably a tuner circuit with a work frequency of less than 5 MHz which comprises a RLC circuit and a phase stabilizer circuit. The signal received by the antenna, after measuring, goes through a filtration state and subsequently, this signal goes through a digital-analogue converter, which in turn is connected to a processor configured to detect the variations in the electrostatic field, creating a three-dimensional map with these variations, being able to define the volume and density of the object that has generated the variation. This processor, in turn, is connected to a radio frequency circuit that transmits an encrypted signal to the control device (100), which is external to the sensor itself (10), and where this control device (100) controls the set of elements that make up the system, as will be seen in each implementation. The circuit is completed with a data storage memory.

A Vehicle's External Security (1)

As can be seen in illustration 2, for a vehicle (1), the antenna (11) can have any position depending on the element that is to be protected, or it can have different antennas (11) joined to one sensor (10), like in illustration 2a, or even one antenna (11) that goes around the vehicle (1) completely, like in illustration 2b. This allows for great versatility in the transport vehicle's security, because it can check on any person approaching or attaching any objects to the vehicle (1), by safely detecting it all. This is all simple, because the antenna (11) will always be attached to the vehicle, given that it is configured as a metallic strip connected to a sensor (10).

Each of the mentioned solutions (the single antenna that surrounds the vehicle or multiple antennas) has its advantages. So, the single antenna allows for surveillance and for the vehicle to be checked at 360°, to control people approaching or objects being attached. On the other hand, the situation of having several antennas has a main advantage which is placing the surveillance in the areas of the vehicle that are prone to being opened (trunk, gas tank, hood) or more prone to being removed (radio antenna, wheels). There are obviously no limits on using both systems together, in such a way that greater precision is obtained concerning disturbances that could affect the whole vehicle.

In any case, all the sensors (10) are connected to a control device (100) that comprises: one or more processors (101); a memory (102); and one or more programs where the program(s) are stored in the memory (102) and configured to be executed by, at least, the processor(s) (101), including the instruction programs for: (i) profiling a disturbance detected by at least one sensor (10); (ii) focusing at least one camera (12) on the at least one sensor's (10) operational area with a detected disturbance; (iii) monitoring the operational area with a sensor (10) with a detected disturbance; (iv) generating a control signal and (v) notifying an alarm management system.

Therefore, a highly efficient vehicle security system is achieved, given that it allows for an object, person or people that cause a disturbance to be profiled at a very low cost by simply including a sensor on the vehicle's bodywork. The outlined system can, for example, check the trunk or the entry of cargo onto an airplane in a completely personalized way, detecting one single person, as well as the permanent detection of a disturbance from any object attached to the vehicle.

Furthermore, profiling the different disturbances and their inclusion in the control device memory (they can be included in the actual engine of the vehicle, be an external element or even be on a mobile phone or tablet type of device) means that any disturbance that happens around the vehicle's security system can be detected with great precision.

A Vehicle's Internal Security (1)

In another specific implementation, as can be seen in illustration 3, for a vehicle (1), the antenna (11) can have any position depending on the element that is to be protected, or it can have different antennas (1) joined to one sensor (11), like in illustration 2a, or even one sensor (10). This allows for great versatility in the transport vehicle's internal security, because it can check on any person inside, detecting them safely. This is all simple, because the antenna (11) will always be attached to the area that is to be monitored, given that it is configured as a metallic strip connected to a sensor (10).

In any case, all the sensors (10) are connected to a control device (100) that comprises: one or more processors (101); a memory (102); and one or more programs where the program(s) are stored in the memory (102) and configured to be executed by, at least, the processor(s) (101), including the instruction programs for: (i) profiling a disturbance detected by at least one sensor (10); (ii) focusing at least one camera (12) on the at least one sensor's (10) operational area with a detected disturbance; (iii) monitoring the operational area with a sensor (10) with a detected disturbance; (iv) generating a control signal and (v) notifying an alarm management system.

Therefore, a highly efficient internal vehicle security system is achieved, given that it allows for an object, person or people that cause a disturbance to be profiled at a very low cost by simply including a sensor on the object that is to be protected, for example, a seat to know the person's position (and know if their belt is on) or an airplane's restroom or a ship's machine room, in a completely personalized way, detecting a single person, as well as the permanent detection of a disturbance from any foreign or attached object, which is achieved from the correct profiling of the disturbance, because each body is detected differently by the antenna (a disturbance by an animal or a person is not the same) and by monitoring it, suitable tracking of a threat from the disturbance can be made.

Parking Control (2)

In another specific implementation, as can be seen in illustration 4 for a vehicle (1), the antenna (11) will be placed outside the vehicle (1) in a parking area (2) for monitoring the parking lot. This is all simple, because the antenna (11) will always be attached to the area that is to be monitored, given that it is configured as a metallic strip connected to a sensor (10).

In any case, all the sensors (10) are connected to a control device (100) that comprises: one or more processors (101); a memory (102); and one or more programs where the program(s) are stored in the memory (102) and configured to be executed by, at least, the processor(s) (101), including the instruction programs for: (i) profiling a disturbance detected by at least one sensor (10); (ii) focusing at least one camera (12) on the at least one sensor's (10) operational area with a detected disturbance; (iii) monitoring the operational area with a sensor (10) with a detected disturbance; (iv) generating a control signal and (v) notifying a parking management system.

Therefore, a highly efficient vehicle parking security system is achieved, given that it can profile the object, person or people that pose the disturbance at a very low cost by simply including the sensor in the actual parking lot, in such a way that it doesn't only protect the vehicle but can also monitor the actual parking lot, like for example, notifying the external server that the space is free.

As has been proven, the control device (100) is the same for all implementations and it can be a specific electronic device or even be installed in the vehicle's engine itself, or be an external element, such as a mobile phone or tablet, as long as it fulfils the individual features indicated for each implementation.

What is claimed is:

1. A vehicle security system (1) comprising, at least:
    a controlled magnetic field sensor (10) connected to at least one antenna (11);
        where this antenna (11) is configured as a single electrode; and
        where the controlled electrostatic field sensor (10) is configured to detect a disturbance in the electrostatic field (3) generated by at least one antenna (11) connected with that sensor (10);
    wherein the at least one antenna (11) is in a position selected between:
        attached to the vehicle (1) in an external surface of the vehicle, given that the antenna (11) is configured as a metallic strip connected to the sensor (10);
        attached to an internal area of the vehicle (1) that is to be monitored given that the antenna (11) is configured as a metallic strip connected to the sensor (10);
        outside the vehicle (1) in a parking area (2) arranged for monitoring a parking lot, attached to the area that is to be monitored given that the antenna (11) is configured as a metallic strip connected to the sensor (10);
    and wherein each sensor (10) is connected to a control device (100) comprising:
        one or more processors (101);
        a memory (102); and
        one or more programs in which the program(s) are stored in the memory (102) and configured to be executed by, at least, the processor(s) (101), including the instruction programs for:
            profiling a disturbance detected by at least one antenna (11) connected to at least one sensor (10);
            focusing at least one camera (12) on at least one area where at least one antenna (11) connected to at least one sensor (10) has detected a disturbance;
            monitoring by the camera (12) at least one area where at least one antenna (11) connected to at least one sensor (10) has detected a disturbance;
            generating a control signal; and
            notifying an external server.

2. The system, in accordance with claim 1, where the antenna (11) that is located in the external surface of the vehicle (1) is a single antenna (11) on the perimeter of the bodywork.

3. The system, in accordance with claim 1, comprising multiple antennas (11) located in an area external to the vehicle and attached to the vehicle's bodywork (1) in the areas prone to being opened or removed.

4. The system, in accordance with claim 1, where the antenna (11) that is located on the internal area of the vehicle (1) is located on at least one of the vehicle's seats.

5. The system, in accordance with claim 1, where the antenna (11) is located in a parking space and configured to detect a vehicle (1) in this space and notify an external server whether there is a vehicle occupying the space or not.

6. A vehicle security method implemented on a system according to claim 1, the method comprising the steps of:
    profiling a disturbance detected by at least one antenna (11) connected to at least one sensor (10);
    focusing at least one camera (12) on at least one area where at least one antenna (11) connected to at least one sensor (10) has detected a disturbance;
    monitoring by the camera (12) at least one area where at least one antenna (11) connected to at least one sensor (10) has detected a disturbance;
    generating a control signal; and
    notifying an external server.

7. The method, in accordance with claim 6, comprising a step of having a single antenna (11) on an area external to the vehicle (1) on the perimeter of the bodywork.

8. The method, in accordance with claim 6, comprising a step of placing multiple antennas (11) located in an area external to the vehicle and attached to the vehicle's bodywork (1) in the areas prone to being opened or removed.

9. The method, in accordance with claim 6, comprising a step of having at least one antenna (11) on at least one area inside the vehicle (1) located on at least one of the vehicle's seats.

10. The method, in accordance with claim 6, comprising the step of placing at least one antenna (11) in at least one parking space; and a step of detecting a vehicle (1) in this space and notifying an external servicer whether a vehicle (1) is occupying at least one parking space or not.

11. The method according to claim 6, where the antenna (11) that is located on an area external to the vehicle (1) is a single antenna (11) on the perimeter of the bodywork.

12. The method according to claim 6 where the system comprises multiple antennas (11) located in an area external to the vehicle and attached to the vehicle's bodywork (1) in the areas prone to being opened or removed.

13. The method according to claim 6, where the antenna (11) that is located on the area inside the vehicle (1) is located on at least one of the vehicle's seats.

14. The method according to claim 6 where the antenna (11) is located in a parking space and configured to detect a vehicle (1) in this space and notify an external server whether there is a vehicle occupying the space or not.

* * * * *